Nov. 1, 1955
C. J. STRID
2,722,398
FLUID CONTROL VALVE
Filed May 27, 1950
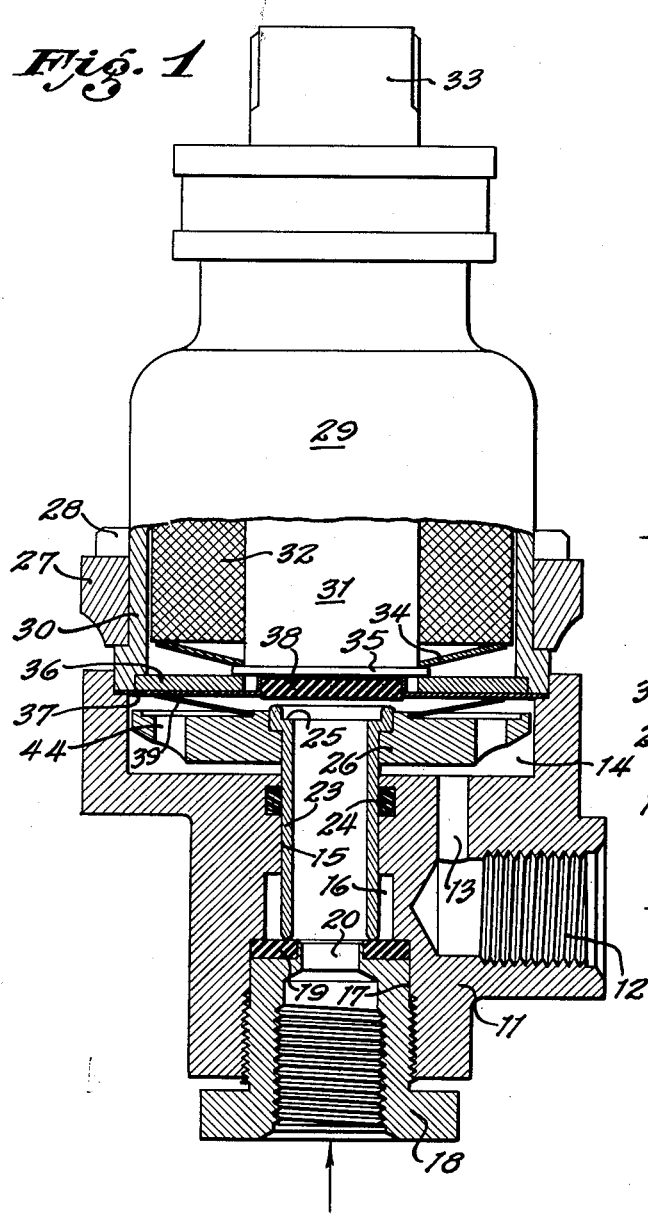
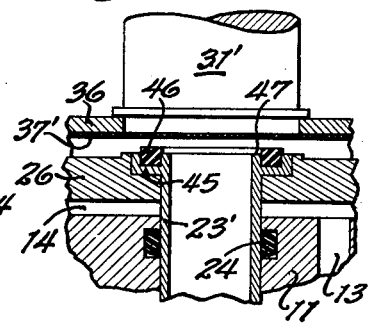
Inventor,
CARL J. STRID
By John H. Rouse,
Attorney

United States Patent Office 2,722,398
Patented Nov. 1, 1955

2,722,398

FLUID CONTROL VALVE

Carl J. Strid, La Canada, Calif., assignor to General Control Co., Glendale, Calif., a corporation of California Application May 27, 1950, Serial No. 164,820

2 Claims. (Cl. 251—141)

This invention relates to fluid control valves.

An object of this invention is to provide a valve structure wherein the closure member is so constructed and arranged that its movements are substantially unaffected by the pressure of the fluid whose flow it controls.

Another object of the invention is to provide a valve structure wherein the movable closure member is in the form of a tubular piston.

Another object is to so form the tubular piston that the fluid pressures acting thereon are substantially balanced.

For full understanding of the invention, and further appreciation of its features and advantages, reference is to be had to the following detailed description and accompanying drawing, and to the appended claims.

In the drawing:

Figure 1 is a sectional view of a valve structure embodying the invention; and

Figure 2 is a fragmentary sectional view showing a modified form of piston-closure.

Referring first more particularly to Fig. 1, the numeral 11 indicates a valve casing having at its right side a threaded opening 12 which communicates, by way of a vertical passage or port 13, with a chamber 14 at the top of the casing. Extending downwardly from the chamber 14 is a cylindrical opening 15 which is enlarged in diameter toward the bottom of the casing to provide an opening 16 and a still larger opening 17 through the bottom of the casing. Threaded in the opening 17 is a hollow fitting 18 whose inner end holds an annular sealing member 19, of soft material such as synthetic rubber, in tight engagement with the shoulder formed at the junction of openings 16 and 17; fitting 18 forming the inlet connection for the valve structure and having at its top a passage or port 20 leading to the opening 16.

Reciprocable in the opening 15 is a tubular piston 23; a seal 24 of the O-ring type, disposed in a recess in the wall of opening 15, preventing leakage past the piston. At its top the piston 23 is expanded to provide an inner shoulder 25 whose area is the same as the effective area (in a horizontal plane) of the rounded surface at the bottom of the piston. Around the upper end of the piston, and rigidly secured thereto, is a disk-like member 26 of magnetic material.

Covering the open top of casing 11, and secured thereto by a ring 27 and bolts 28, is an electromagnet 29 comprising an outer shell 30 and a cylindrical core 31 depending from the top wall of the shell; the shell and core both being of magnetic material and having in the annular recess between them an energizing coil 32 whose leads extend to a socket 33 at the top of the structure whereby the electromagnet can be connected in a suitable control circuit. The coil 32 is supported at its bottom by a notched disk-spring 34 which bears against a collar 35 formed on core 31. Between the shell 30 and core 31 at the bottom of the electromagnet is a washer 36 of non-magnetic material such as brass. Interposed between the electromagnet and the valve casing is a disk or diaphragm 37, of thin non-magnetic material such as copper or stainless steel, which serves to seal the interior of the electromagnet from fluid in the casing-chamber 14. In the underside of core 31 is a circular recess for a valve seat 38 of soft material such as synthetic rubber; the diaphragm 37 being formed at its center to fit closely in the recess. The disk-like member 26 in chamber 14 constitutes an armature which is attracted toward the electromagnet 29 when the same is energized, the piston 23 being raised along with the armature so that the rounded top surface or edge of the piston sealingly engages the seat 38. The piston and armature assembly is biased downwardly by a notched or slotted disk-spring 39 which bears against the armature and the diaphragm 37.

While the electromagnet is unenergized and the parts are in the positions shown in Fig. 1, fluid entering the structure by way of port 20 passes through the interior of piston 23 to the space above armature 26 and, around the armature and through openings 44 therein, to chamber 14; the fluid passing from this chamber through port 13 to the outlet opening 12.

Upon energization of the electromagnet armature 26 and piston 23 are raised against the biasing force of disk-spring 39 so that flow through the structure is obstructed by engagement of the top edge of the piston with seat 38. When the piston is in this raised position, the fluid pressure then acting upwardly on the rounded bottom surface or edge of the piston is balanced by the fluid pressure acting downwardly on shoulder 25 of the piston near its top so that, even when the fluid pressure is high, only a small amount of force is required to effect return of the piston to its depressed position when the electromagnet is subsequently deenergized.

The fragmentary view of Fig. 2 discloses a modified piston-closure 23' having an enlarged upper end portion 45 in whose top surface is an annular recess containing a ring member 46 of soft material such as synthetic rubber. The underside of core member 31' of Fig. 2 is not recessed (as in Fig. 1) but presents a plane surface which, together with the plane metallic diaphragm or covering 37', serves as a seat engageable by the ring member 46 when the piston is raised. The surface or shoulder of the piston indicated at 47 in Fig. 2 corresponds to the pressure-balancing shoulder 25 in Fig. 1. The operation of a valve structure according to Fig. 1 when modified as shown in Fig. 2 is the same as that described in connection with Fig. 1.

The specific embodiments of my invention herein shown and described are obviously susceptible of modification without departing from the spirit of the invention, and I intend therefore to be limited only by the scope of the appended claims.

I claim as my invention:

1. In a fluid control valve: a casing having a chamber therein, and a cylindrical opening extending from the chamber; said casing having an inlet port for pressure fluid communicating with the end of said opening away from said chamber, and an outlet port communicating with the chamber; a tubular piston sealingly reciprocable in said opening and having an end portion extending within said chamber; means in said chamber forming an imperforate seat engageable by the end of the piston within the chamber so that flow from said inlet port through the piston and the chamber to said outlet port is obstructed when the piston is thus seated; and electromagnetic means for moving the piston into and out of seating position; said piston being expanded adjacent its end within the chamber to provide an inner shoulder facing said seat-forming means and spaced therefrom when the piston is seated, the area of said shoulder being approximately the same as that of the surface at the end of the piston away from said chamber, so that the fluid pressures on said shoulder and on said end surface of the piston are then in opposition and substantially equal.

2. In a fluid control valve: a casing having a chamber therein, and a cylindrical opening extending from the chamber; said casing having an inlet port for pressure fluid communicating with the end of said opening away from said chamber, and an outlet port communicating with the chamber; a tubular piston sealingly fitting said cylindrical opening and reciprocable therein, an end portion of said piston extending within the chamber; means forming an annulus surrounding, and sealingly mounted on, the end of the piston within the chamber and extending axially therebeyond; means in said chamber forming an imperforate seat engageable by said annulus so that flow of pressure fluid from said inlet port through the piston and the chamber to said outlet port is obstructed when said annulus is in engagement with the seat-forming means and the piston is thus seated, said end of the piston within the chamber being then spaced from the seat-forming means so that the pressure of the fluid is applied to the opposite end-surfaces of the piston; said opposite end-surfaces of the piston being of approximately equal area; and electromagnetic means for moving the piston into and out of seating position.

References Cited in the file of this patent
UNITED STATES PATENTS

| | | |
|---|---|---|
| 409,170 | Wheeler et al. | Aug. 20, 1889 |
| 537,266 | Birkery | Apr. 9, 1895 |
| 618,709 | Moreland | Jan. 31, 1899 |
| 1,092,984 | Ewalt | Apr. 14, 1914 |
| 1,251,730 | Younie et al. | Jan. 1, 1918 |
| 1,656,132 | Arrasmith et al. | Jan. 10, 1928 |